(12) United States Patent
Kotowski et al.

(10) Patent No.: US 7,826,589 B2
(45) Date of Patent: Nov. 2, 2010

(54) SECURITY SYSTEM FOR SCREENING PEOPLE

(75) Inventors: Andreas Kotowski, Rancho Palos Verdes, CA (US); Ronald J. Hughes, Garden Grove, CA (US)

(73) Assignee: Rapiscan Systems, Inc., Torrance, CA (US)

( * ) Notice: Subject to any disclaimer, the term of this patent is extended or adjusted under 35 U.S.C. 154(b) by 39 days.

(21) Appl. No.: 12/344,162

(22) Filed: Dec. 24, 2008

(65) Prior Publication Data

US 2010/0067654 A1    Mar. 18, 2010

Related U.S. Application Data (60) Provisional application No. 61/016,590, filed on Dec. 25, 2007.

(51) Int. Cl.
*G01N 23/201* (2006.01)

(52) U.S. Cl. .......................... 378/57; 378/87

(58) Field of Classification Search ............. 378/57, 378/62, 86–97
See application file for complete search history.

(56) References Cited

U.S. PATENT DOCUMENTS

| | | |
|---|---|---|
| 3,678,278 A | 7/1972 | Peil |
| 3,780,291 A | 12/1973 | Stein et al. |
| 3,790,799 A | 2/1974 | Stein et al. |
| 3,843,881 A | 10/1974 | Barton, Jr. et al. |
| 3,884,816 A | 5/1975 | Takahashi |
| RE28,544 E | 9/1975 | Stein et al. |
| 3,919,467 A | 11/1975 | Peugeot |
| 3,924,064 A | 12/1975 | Nomura et al. |
| 4,020,346 A | 4/1977 | Dennis |
| 4,031,545 A | 6/1977 | Stein et al. |
| 4,047,035 A | 9/1977 | Dennhoven et al. |
| 4,070,576 A | 1/1978 | Cobb |
| 4,112,301 A | 9/1978 | Annis et al. |
| 4,139,771 A | 2/1979 | Dennhoven et al. |
| 4,160,165 A | 7/1979 | McCombs et al. |
| 4,179,100 A | 12/1979 | Sashin et al. |
| 4,196,352 A | 4/1980 | Berninger et al. |
| 4,200,800 A | 4/1980 | Swift |
| 4,228,353 A | 10/1980 | Johnson |
| 4,228,357 A | 10/1980 | Annis |
| 4,242,583 A | 12/1980 | Annis et al. |
| 4,242,588 A | 12/1980 | Silk et al. |

(Continued)

FOREIGN PATENT DOCUMENTS

| | | |
|---|---|---|
| EP | 0261984 | 3/1988 |
| WO | PCT/US2008/088345 | 7/2009 |

*Primary Examiner*—Hoon Song
(74) *Attorney, Agent, or Firm*—Patentmetrix (57) ABSTRACT

The present invention is directed towards an X-ray people screening system capable of rapidly screening people for detection of metals, low Z materials (plastics, ceramics and illicit drugs) and other contraband which might be concealed beneath the person's clothing or on the person's body. In an exemplary embodiment, the scanning system has two scanning modules that are placed in parallel, yet opposing positions relative to each other. The two modules are spaced to allow a subject, such as a person, to stand and pass between the two scanning modules. The first module and second module each include a radiation source (such as X-ray radiation) and a detector array. The subject under inspection stands between the two modules such that a front side of the subject faces one module and the back side of the subject faces the other module.

18 Claims, 5 Drawing Sheets

U.S. PATENT DOCUMENTS

| | | | |
|---|---|---|---|
| 4,260,898 A | 4/1981 | Annis | |
| 4,298,800 A | 11/1981 | Goldman | |
| 4,303,830 A | 12/1981 | Heinzelmann et al. | |
| 4,342,914 A | 8/1982 | Bjorkholm | |
| 4,349,739 A | 9/1982 | Annis | |
| 4,366,382 A | 12/1982 | Kotowski | |
| 4,366,576 A | 12/1982 | Annis | |
| 4,389,729 A | 6/1983 | Stein | |
| 4,414,682 A | 11/1983 | Annis et al. | |
| 4,422,177 A | 12/1983 | Mastronardi et al. | |
| 4,426,721 A | 1/1984 | Wang | |
| 4,454,605 A | 6/1984 | DeLucia | |
| 4,472,822 A | 9/1984 | Swift | |
| 4,503,332 A | 3/1985 | Annis | |
| 4,514,691 A | 4/1985 | De Los Santos et al. | |
| 4,535,245 A | 8/1985 | Zonneveld et al. | |
| 4,549,307 A | 10/1985 | Macovski | |
| 4,586,441 A | 5/1986 | Zekich | |
| 4,598,415 A | 7/1986 | Luccio et al. | |
| 4,672,837 A | 6/1987 | Cottrell, Jr. | |
| 4,711,994 A | 12/1987 | Greenberg | |
| 4,736,401 A | 4/1988 | Donges et al. | |
| 4,756,015 A | 7/1988 | Doenges et al. | |
| 4,759,047 A | 7/1988 | Donges et al. | |
| 4,768,214 A | 8/1988 | Bjorkholm | |
| 4,783,794 A | 11/1988 | Dietrich | |
| 4,799,247 A | 1/1989 | Annis et al. | |
| 4,807,637 A | 2/1989 | Bjorkholm | |
| 4,809,312 A | 2/1989 | Annis | |
| 4,817,121 A | 3/1989 | Shimizu et al. | |
| 4,819,256 A | 4/1989 | Annis et al. | |
| 4,821,023 A | 4/1989 | Parks | |
| 4,825,454 A | 4/1989 | Annis et al. | |
| 4,839,913 A | 6/1989 | Annis et al. | |
| 4,845,769 A | 7/1989 | Burstein et al. | |
| 4,864,142 A | 9/1989 | Gomberg | |
| 4,870,670 A | 9/1989 | Geus | |
| 4,884,289 A | 11/1989 | Glockmann et al. | |
| 4,890,310 A | 12/1989 | Umetani et al. | |
| 4,893,015 A | 1/1990 | Kubierschky et al. | |
| 4,899,283 A | 2/1990 | Annis | |
| 4,974,247 A | 11/1990 | Friddell | |
| 4,979,137 A | 12/1990 | Gerstenfeld et al. | |
| 5,007,072 A | 4/1991 | Jenkins et al. | |
| 5,022,062 A | 6/1991 | Annis | |
| 5,033,073 A | 7/1991 | Friddell | |
| 5,039,981 A | 8/1991 | Rodriguez | |
| 5,044,002 A | 8/1991 | Stein | |
| 5,084,619 A | 1/1992 | Pfeiler et al. | |
| 5,115,459 A | 5/1992 | Bertozzi | |
| 5,127,030 A | 6/1992 | Annis et al. | |
| 5,132,995 A | 7/1992 | Stein | |
| 5,156,270 A | 10/1992 | Kachel et al. | |
| 5,179,581 A | 1/1993 | Annis | |
| 5,181,234 A | 1/1993 | Smith | |
| 5,182,764 A | 1/1993 | Peschmann et al. | |
| 5,224,144 A | 6/1993 | Annis | |
| 5,243,693 A | 9/1993 | Maron | |
| 5,247,561 A | 9/1993 | Kotowski | |
| 5,253,283 A | 10/1993 | Annis et al. | |
| 5,260,982 A | 11/1993 | Fujii et al. | |
| 5,313,511 A | 5/1994 | Annis et al. | |
| 5,367,552 A | 11/1994 | Peschmann | |
| 5,397,986 A | 3/1995 | Conway et al. | |
| 5,420,905 A | 5/1995 | Bertozzi | |
| 5,463,224 A | 10/1995 | Burstein et al. | |
| 5,483,569 A | 1/1996 | Annis | |
| 5,490,218 A | 2/1996 | Krug et al. | |
| 5,503,424 A | 4/1996 | Agopian | |
| 5,524,133 A | 6/1996 | Neale et al. | |
| 5,572,121 A | 11/1996 | Beswick | |
| 5,579,360 A | 11/1996 | Abdel-Mottaleb | |
| 5,590,057 A | 12/1996 | Fletcher et al. | |
| 5,600,303 A | 2/1997 | Husseiny et al. | |
| 5,600,700 A | 2/1997 | Krug et al. | |
| 5,602,893 A | 2/1997 | Harding | |
| 5,642,393 A | 6/1997 | Krug et al. | |
| 5,642,394 A | 6/1997 | Rothschild | |
| 5,660,549 A | 8/1997 | Witt, III | |
| 5,666,393 A | 9/1997 | Annis | |
| 5,699,400 A | 12/1997 | Lee et al. | |
| 5,764,683 A | 6/1998 | Swift et al. | |
| 5,796,110 A | 8/1998 | An et al. | |
| 5,838,758 A | 11/1998 | Krug et al. | |
| 5,882,206 A | 3/1999 | Gillio | |
| 5,966,422 A | 10/1999 | Dafni et al. | |
| 5,974,111 A | 10/1999 | Krug et al. | |
| 6,018,562 A | 1/2000 | Willson | |
| 6,044,353 A | 3/2000 | Pugliese, III | |
| 6,094,472 A | 7/2000 | Smith | |
| 6,137,895 A | 10/2000 | Al-Sheikh | |
| 6,269,142 B1 | 7/2001 | Smith | |
| 6,278,115 B1 | 8/2001 | Annis et al. | |
| 6,298,603 B1 | 10/2001 | Diaz | |
| 6,301,327 B1 | 10/2001 | Martens et al. | |
| 6,308,644 B1 | 10/2001 | Diaz | |
| 6,315,308 B1 | 11/2001 | Konopka | |
| RE37,467 E | 12/2001 | Brasch et al. | |
| 6,366,203 B1 | 4/2002 | Burns | |
| 6,370,222 B1 | 4/2002 | Cornick, Jr. | |
| 6,393,095 B1 | 5/2002 | Robinson | |
| 6,484,650 B1 | 11/2002 | Stomski | |
| 6,507,278 B1 | 1/2003 | Brunetti et al. | |
| 6,546,072 B1 | 4/2003 | Chalmers | |
| 6,552,346 B2 | 4/2003 | Verbinski et al. | |
| 6,597,760 B2 | 7/2003 | Beneke et al. | |
| 6,610,977 B2 | 8/2003 | Megerle | |
| 6,665,373 B1 | 12/2003 | Kotowski et al. | |
| 6,707,879 B2 | 3/2004 | McClelland et al. | |
| 6,721,391 B2 | 4/2004 | McClelland et al. | |
| 6,742,301 B1 | 6/2004 | Schwarz | |
| 6,745,520 B2 | 6/2004 | Puskaric et al. | |
| 6,785,360 B1 * | 8/2004 | Annis | 378/137 |
| 6,819,109 B2 | 11/2004 | Sowers et al. | |
| 6,819,241 B2 | 11/2004 | Turner et al. | |
| 6,870,791 B1 | 3/2005 | Caulfield et al. | |
| 6,899,540 B1 | 5/2005 | Neiderman et al. | |
| 6,901,346 B2 | 5/2005 | Tracy et al. | |
| 6,911,907 B2 | 6/2005 | Kelliher et al. | |
| 6,967,612 B1 | 11/2005 | Gorman et al. | |
| 6,970,086 B2 | 11/2005 | Nelson | |
| 6,970,087 B2 | 11/2005 | Stis | |
| 7,053,785 B2 | 5/2006 | Akins | |
| 7,092,485 B2 | 8/2006 | Kravis | |
| 7,110,493 B1 | 9/2006 | Kotowski et al. | |
| 7,110,925 B2 | 9/2006 | Pendergraft et al. | |
| 7,257,189 B2 | 8/2007 | Modica et al. | |
| 7,286,634 B2 | 10/2007 | Sommer, Jr. et al. | |
| 7,418,077 B2 | 8/2008 | Gray | |
| 7,505,557 B2 | 3/2009 | Modica et al. | |
| 7,505,562 B2 * | 3/2009 | Dinca et al. | 378/87 |
| 2002/0045152 A1 | 4/2002 | Viscardi et al. | |
| 2003/0025302 A1 | 2/2003 | Urffer, III et al. | |
| 2003/0171939 A1 | 9/2003 | Yagesh et al. | |
| 2003/0214407 A1 | 11/2003 | Sweatte | |
| 2003/0225612 A1 | 12/2003 | DeSimone et al. | |
| 2003/0229506 A1 | 12/2003 | Scott et al. | |
| 2004/0051265 A1 | 3/2004 | Nadeau | |
| 2004/0109532 A1 | 6/2004 | Ford et al. | |
| 2004/0120454 A1 | 6/2004 | Ellenbogen et al. | |
| 2005/0024199 A1 | 2/2005 | Huey et al. | |
| 2007/0172026 A1 | 7/2007 | Schlomka | |

* cited by examiner

SECURITY SYSTEM FOR SCREENING PEOPLE

CROSS-REFERENCE TO RELATED APPLICATIONS

The present invention relies on, for priority, U.S. Provisional Patent Application No. 61/016,590, of the same title, filed on Dec. 25, 2007.

FIELD OF THE INVENTION

The present invention generally relates to the field of X-ray screening systems for screening people, and more specifically to an inspection system that uses a first module and a second module to sequentially or simultaneously scan both the front side and the back side of a subject without requiring the subject to rotate. In addition, the present invention relates to an inspection system that that uses a first module and a second module for generating images from both a) image signals backscattered from the subject and b) shadow image signals created from X-rays that do not strike the subject during a scan.

BACKGROUND OF THE INVENTION

Security systems are presently limited in their ability to detect contraband, weapons, explosives, and other dangerous objects concealed under clothing. Metal detectors and chemical sniffers are commonly used for the detection of large metal objects and some types of explosives; however, a wide range of dangerous objects exist that cannot be detected with these devices. Plastic and ceramic weapons are non-metallic objects that security personnel are required to detect. Currently, existing systems do not detect such objects well, and the alternative of manual searching is slow, inconvenient, and not well tolerated by the general public, especially as a standard procedure in, for example, airports.

Prior art X-ray systems for detecting objects concealed on persons do exist and can be improved from the perspective of radiation dosing, scanning speed and image quality. For example, U.S. Pat. No. 5,181,234 (hereinafter, the "'234 patent"), assigned to the assignee of the present invention, and herein incorporated by reference in its entirety, describes "[a] pencil beam of X-rays is scanned over the surface of the body of a person being examined. X-rays that are scattered or reflected from the subject's body are detected by a detector. The signal produced by this scattered X-ray detector in then used to modulate an image display device to produce an image of the subject and any concealed objects carried by the subject. The detector assembly is constructed in a configuration to automatically and uniformly enhance the image edges of low atomic number (low Z) concealed objects to facilitate their detection. A storage means is provided by which previously acquired images can be compared with the present image for analyzing variances in similarities with the present image, and provides means for creating a generic representation of the body being examined while suppressing anatomical features of the subject to minimize invasion of the subject's privacy." The system, as described, however, requires that the subject assume at least two poses for a full scan. Even with the at least two poses, certain areas of the subject may not be captured due to hidden areas. In addition, the scanning system of the '234 patent is only capable of detecting backscattered radiation, due to the position of the detector array. This patent is incorporated by reference.

In addition, U.S. Pat. No. 6,094,472 (hereinafter, the "'472 patent"), also assigned to the assignee of the present invention, describes a method for using an X-ray backscatter imaging system for searching a subject for concealed objects, "comprising the steps of: moving the subject within a passageway, the passageway having an entrance and an exit; initiating operation of at least one X-ray source upon entry of the subject into the passageway; producing a pencil beam of X-rays having a low dose directed toward a scanning area at a plurality of scanning positions within the passageway; scanning the pencil beam of X-rays over the scanning area; tracking said pencil beam of X-rays to each of said plurality of scanning positions, wherein the tracking is substantially coordinated with forward progress of the subject through the passageway; using a plurality of detectors, detecting X-rays that are backscattered from said pencil beam as a result of interacting with the subject when positioned at each scanning position of the plurality of scanning positions; and displaying a digitally represented image of the detected backscattered X-rays." The '472 patent suffers from the same disadvantages as the '234 patent in that it is only capable of detecting backscattered radiation, due to the positioning of the detector array and radiation sources and requires that the subject move through the passageway of the system, thus complicating detection capability due to the motion of the subject. This patent is incorporated by reference.

Further, U.S. Pat. No. 6,393,095 (hereinafter the "'095 patent), issued to Robinson, describes a method for detecting a defect in a sample in which "a pair of stereoscopic images of the sample are produced, one image is subtracted from the other to provide a resulting two dimensional image, and that said resulting two dimensional image is checked against a golden two dimensional image which has been produced in identical fashion from the said golden sample, identity of the two images indicating identity between the said sample and the said golden sample, differences indicating a difference between the said sample and the said golden sample." The '095 patent, however, uses methods of subtracting resultant images, rather than combining images. This patent is incorporated by reference.

The above-mentioned systems, while effective at people screening, have low overall throughput and require several scanning or image acquisition steps. In addition, they require large amounts of operational space, which is not always available at a given inspection site.

Accordingly, there is need for a relatively compact people screening system that is capable of scanning both the front side and back side of a person without requiring the person to rotate or walk through for additional scans, thereby enabling relatively higher overall system throughput.

Further, conventional people screening systems generally contend with the competing interests of image quality and privacy, usually at the expense of either one of the two. Thus, there is a need for a people screening system that uses a combination of backscatter image signals with shadow image signals to provide higher quality images for better edge enhancement and contraband detection without invading privacy of the person.

SUMMARY OF THE INVENTION

In one embodiment, the present invention comprises an imaging apparatus for detecting a concealed object carried on a human body comprising: a first module, further comprising a first X-ray source for producing a first pencil beam of X-rays directed toward said human body and a first detector assembly providing a signal representative of the intensity of the X-rays scattered from said human body as a result of being scanned by the first X-ray source, said first detector assembly being disposed on a same side of said human body as said first X-ray source and having an active area for receiving a portion of said scattered X-rays from said human body as a result of being scanned by said first X-ray source and a portion of transmitted X-rays; a second module, further comprising a second X-ray source for producing a second pencil beam of X-rays directed toward said human body and a second detector assembly providing a signal representative of the intensity of the X-rays scattered from said human body as a result of being scanned by said second X-ray source, said second detector assembly being disposed on a same side of said human body as said second X-ray source and having an active area for receiving a portion of said scattered X-rays from said human body as a result of being scanned by said second X-ray source and a portion of transmitted X-rays from the first module; a processor for processing detector signals generated from said first detector assembly and second detector assembly to form at least one image; and a display for presenting said at least one image to an operator.

Optionally, the imaging apparatus further comprises an enclosure having four walls, at least one ceiling and at least one floor with a pressure sensitive sensor that transmits signals to a processor to initiate scanning Optionally, the processor comprises programmable code that causes the first module to scan the human body while the second X-ray source is not activated. Optionally, the processor comprises programmable code that causes said second module to scan the human body while the first X-ray source is not activated. Optionally, the processor comprises programmable code that causes the first module or the second module to move vertically. Optionally, the vertical movement is coordinated. Optionally, the first module is interchangeable with the second module. Optionally, the processor comprises programmable code that uses signals representative of the intensity of the X-rays scattered from said human body as a result of being scanned by the first X-ray source from first detector assembly and signals representative of the intensity of the X-rays scattered from said human body as a result of being scanned by the second X-ray source from second detector assembly to generate said image. Optionally, the processor processes programmable code that uses signals representative of the intensity of the X-rays scattered from said human body as a result of being scanned by the second X-ray source from second detector assembly and signals representative of the intensity of the X-rays scattered from said human body as a result of being scanned by the first X-ray source from first detector assembly to generate said image.

Optionally, the processor processes programmable code that uses signals representative of the intensity of the transmitted X-rays from the first module to form a shadow image of the human body. Optionally, the processor processes programmable code that uses signals representative of the intensity of the transmitted X-rays from the second module to form a shadow image of the human body. Optionally, the first module and second module sequentially scan the human body. Optionally, the first module and second module move vertically in a synchronous manner such that, while the first detector array captures backscattered image signals, the second detector array captures transmitted signals that are not absorbed or backscattered by the human body. Optionally, the first module and second module move vertically in a synchronous manner such that, while the second detector array captures backscattered image signals, the first detector array captures transmitted signals that are not absorbed or backscattered by the human body. Optionally, the signals produced from the first detector array and second detector array are routed to the processor along with synchronization signals.

In another embodiment, the present invention comprises a first module, further comprising a first X-ray source and a first detector assembly, said first detector assembly being disposed on a same side of said human body as said first X-ray source and having an active area for receiving a portion of X-rays scattered from said human body as a result of being scanned by said first X-ray source and a portion of transmitted X-rays; a second module, further comprising a second X-ray source and a second detector assembly, said second detector assembly being disposed on a same side of said human body as said second X-ray source and having an active area for receiving a portion of said scattered X-rays from said human body as a result of being scanned by said second X-ray source and a portion of transmitted X-rays from the first module; wherein said first and second modules are parallel to each other; a processor for processing detector signals generated from said first detector assembly and second detector assembly to form at least one image wherein said processor comprises programmable code that uses signals representative of the intensity of the X-rays scattered from said human body as a result of being scanned by the first X-ray source from first detector assembly and signals representative of the intensity of the X-rays scattered from said human body as a result of being scanned by the second X-ray source from second detector assembly to generate said image; and a display for presenting said at least one image to an operator.

Optionally, the first module and second module sequentially scan the human body. Optionally, the first module and second module move vertically in a synchronous manner such that, while the first detector array captures backscattered image signals, the second detector array captures transmitted signals that are not absorbed or backscattered by the human body.

BRIEF DESCRIPTION OF THE DRAWINGS

These and other features and advantages of the present invention will be appreciated, as they become better understood by reference to the following detailed description when considered in connection with the accompanying drawings, wherein.

DETAILED DESCRIPTION OF THE INVENTION

The present invention is directed towards an X-ray people screening system capable of rapidly screening people for detection of metals, low Z materials (plastics, ceramics and illicit drugs) and other contraband which might be concealed beneath the person's clothing or on the person's body.

In an exemplary embodiment, the present invention is directed towards an object detection system in which two scanning modules are placed in parallel, yet opposing positions relative to each other. The two modules (hereinafter, by way of reference only, first module and second module) are spaced to allow a subject, such as a person, to stand and pass between the two scanning modules. The first module and second module each include a radiation source (such as X-ray radiation) and a detector array. The subject under inspection stands between the two modules such that a front side of the subject faces one module and the back side of the subject faces the other module.

In one embodiment, the modules sequentially scan the subject from the front and the back. The sequentially scanned images are combined to form a complete image of the subject. Thus, the present invention is directed towards a people screening system in which both the front and back images of a subject under inspection are generated while the subject stands in a single position. Further, the sequential scanning ensures that the scanning X-ray beams from the two modules do not interfere with each other. Moreover in placing the detector arrays on opposing sides of each radiation source, the inspection system of present invention detects both backscattered radiation and transmitted radiation (the shadow of the subject), thus enhancing image quality. Additionally, the images generated by the detected backscattered radiation and shadow of the subject are combined to further enhance image quality.

In one embodiment, edge enhancement is provided while simultaneously suppressing the edges of internal anatomy that produce confusion in image interpretation.

In another embodiment, a storage means is provided by which previously acquired images can be compared with the present image for analyzing variances in the present image.

The present invention also provides means for creating a non-human representation of the body being examined to thereby permit faster inspection with less invasion of privacy. One embodiment of the present invention does not require the operator to view an actual image of the subject's body to obtain an indication of objects desired to be detected; rather, a generic body outline or template can be used to indicate relative location of concealed objects. This eases concerns related to a possibly objectionable invasion of privacy. These techniques are discussed in detail in co-pending U.S. patent application Ser. No. 12/204,320, entitled "Personnel Security Screening System with Enhanced Privacy", filed on Feb. 2, 2008, and herein incorporated by reference in its entirety.

Various modifications to the preferred embodiment, disclosed herein, will be readily apparent to those of ordinary skill in the art and the disclosure set forth herein may be applicable to other embodiments and applications without departing from the spirit and scope of the present invention and the claims hereto appended. Reference will now be made in detail to specific embodiments of the invention. Language used in this specification should not be interpreted as a general disavowal of any one specific embodiment or used to limit the claims beyond the meaning of the terms used therein.

Figure 1:
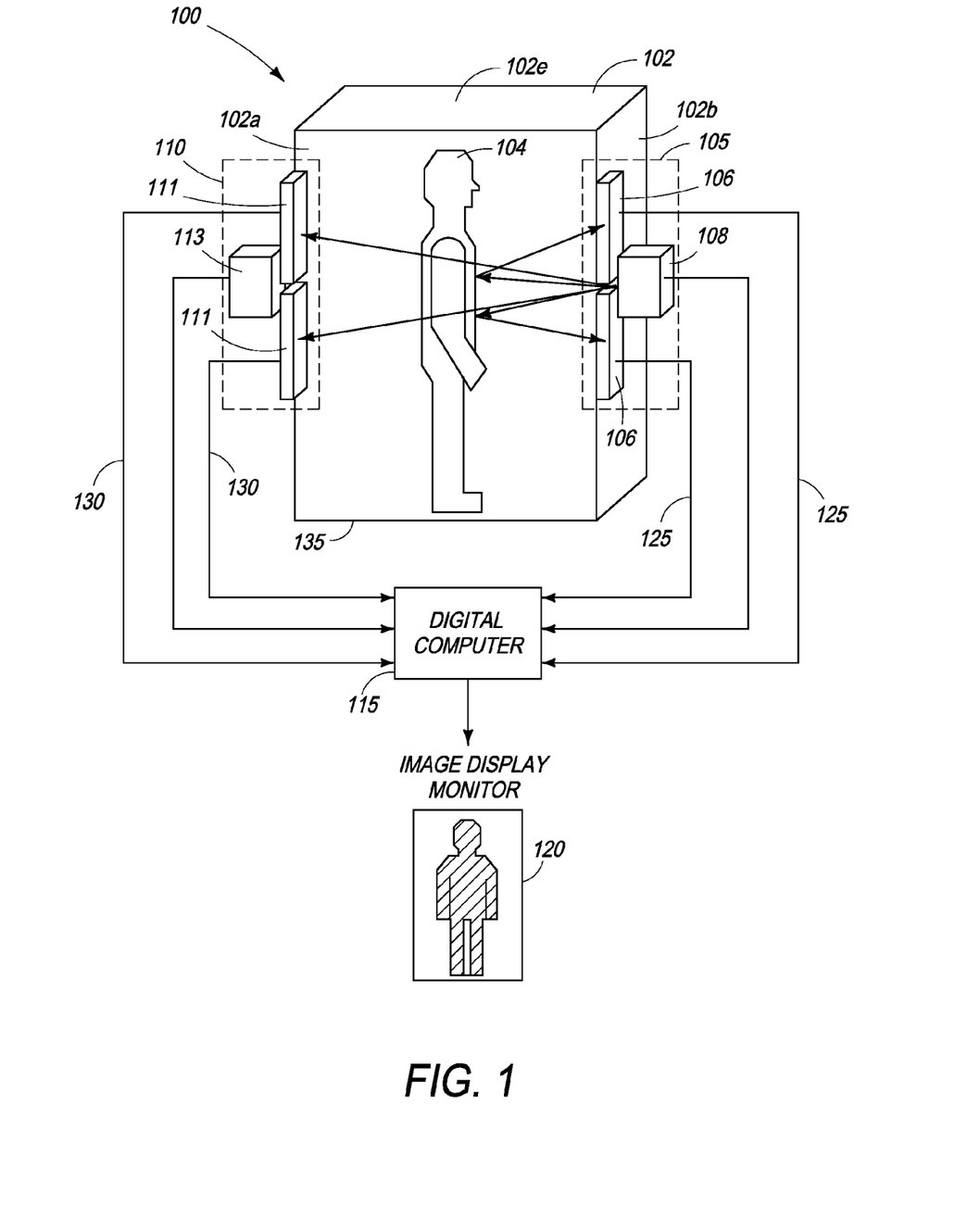
FIG. 1 is a side view of the screening system of the present invention, further illustrating the position of a subject under inspection.

FIG. 1 is a side view of the screening system 100 of the present invention, further illustrating the position of a subject 104 under inspection. In one embodiment, the screening system optionally comprises an enclosure 102, having four walls (two of which are shown as 102a and 102b), ceiling 102e, and a floor 135. It should be understood by those of ordinary skill in the art that such an enclosure is exemplary and any number of suitable enclosures may be employed. For example, and not limited to such example, the enclosure may be free of a ceiling or at least one wall. The enclosure 102 houses the elements of the X-ray imaging system 100 and is designed to form a housing or passageway that extends through the imaging system 100 from an entry point to an exit point.

In one embodiment, X-ray imaging system 100 comprises a first module 105 and a second module 110. In one embodiment, a subject 104 is sequentially scanned by the first module 105 and second module 110 to allow for a complete front side and back side screening of the subject 104, for concealed weapons or contraband, as the subject stands between the two modules 105, 110 through the enclosure 102.

The first module 105, which, in one embodiment, is designed to be interchangeable with the second module 110, comprises a radiation source 108 and a detector array 106. Similarly, the second module 110 comprises a radiation source 113 and a detector array 111. Interchangeability is not a necessity, but may be a desirable feature of the system 100 for a variety of reasons including simplicity in the manufacturing of the modules 105, 110. In other embodiments, module 105 is designed as a "mirror" version of module 110 such that the radiation sources 108, 113 are located in directly opposing positions as illustrated in FIG. 1.

Screening system 100 further comprises a processor system that includes computer processor 115 for processing detected X-rays as input from the first module 105 and second module 110, generating representative images from the inputs, and delivering the resultant images to a monitor 120 from the detected X-rays. The processor assembly may be provided as part of the structure 102, or it may be remotely located utilizing appropriate cables or wireless connections known to persons of ordinary skill in the art.

In one embodiment of the screening system of the present invention, radiation source 108 on first module 105 emits X-rays that are incident upon the front side of the subject under inspection 104 when the subject 104 is facing forward and looking at the first module 105. Some of the incident X-rays that reach the subject are backscattered, and subsequently received by the detector array 106 of the first module 105, thus generating an image of the front side of the subject 104. Those incident X-rays neither absorbed by nor backscattered by the subject 104 are received by the detector array 111 located at the second module 110. Thus, the detector array 111 receives X-ray radiation from the first module that can be processed to form a transmission image, or shadow image, of the subject 104. Data from the detectors 106, 111 of both the first and second modules 105, 110 are combined to recreate an image of the front side of the subject.

In a similar manner, radiation source 113 on second module 110 emits X-rays that are incident upon the back side of the subject under inspection 104. Some of the incident X-rays that reach the subject are backscattered, and subsequently received by the detector array 111 of the second module 110, thus generating an image of the back side of the subject 104. Those incident X-rays neither absorbed by nor backscattered by the subject 104 are received by the detector array 106 located at the first module 105. Thus, the detector array 106 receives X-ray radiation from the second module that can be processed to form a transmission image, or shadow image, of the subject 104. Data from the detectors 106, 111 of both the first and second modules 105, 110 are combined to recreate an image of the front side of the subject.

In one embodiment, first module 105 and second module 110 sequentially scan the subject 104. When the first module 105 is scanning a first side of the subject 104, the X-ray source of the second module remains deactivated; however, both modules move vertically and in sync with each other so that while the detector array 106 of the first module 105 captures the backscattered image signals, the detector array 111 of the second module 110 captures the shadow image signals produced by the X-rays generated from the radiation source 108 of the first module 105 that are not absorbed or backscattered by the subject.

Subsequently, once the first module 105 has scanned the first side of the subject, the radiation source 108 is deactivated and the radiation source 113 of the second module 110 is activated to begin scanning the second side, back side of the subject 104. Again, both modules move vertically in sync with each other so that while the detector array 111 of the second module 110 captures the backscattered image signals, the detector array 106 of the first module 105 captures the shadow image signals produced by the X-rays generated from the radiation source 113 of the second module 110 that are not absorbed or backscattered by the subject.

Figure 2A:
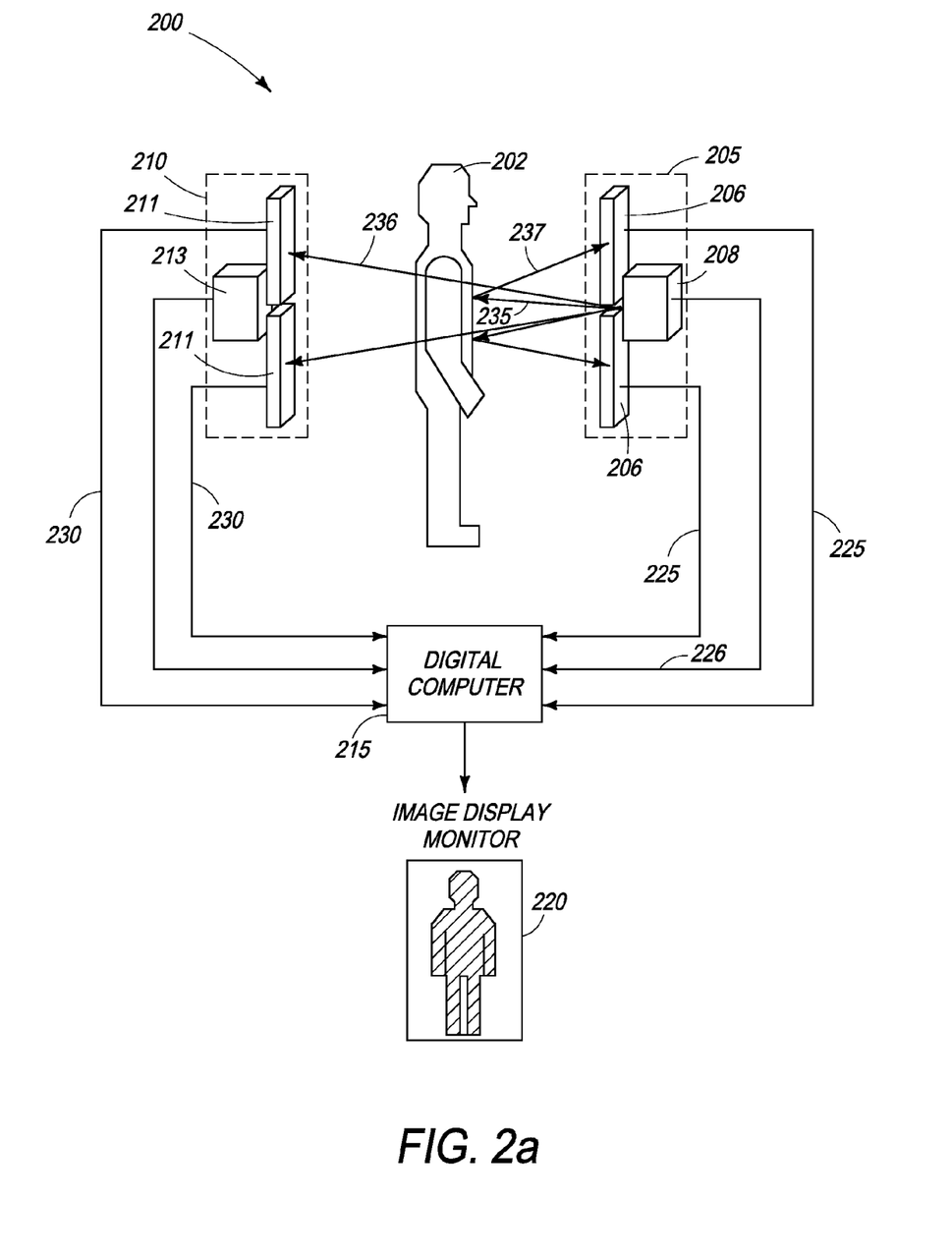
FIG. 2a is a side view of the screening system of the present invention, further illustrating a subject being scanned by the first module.
Figure 2B:
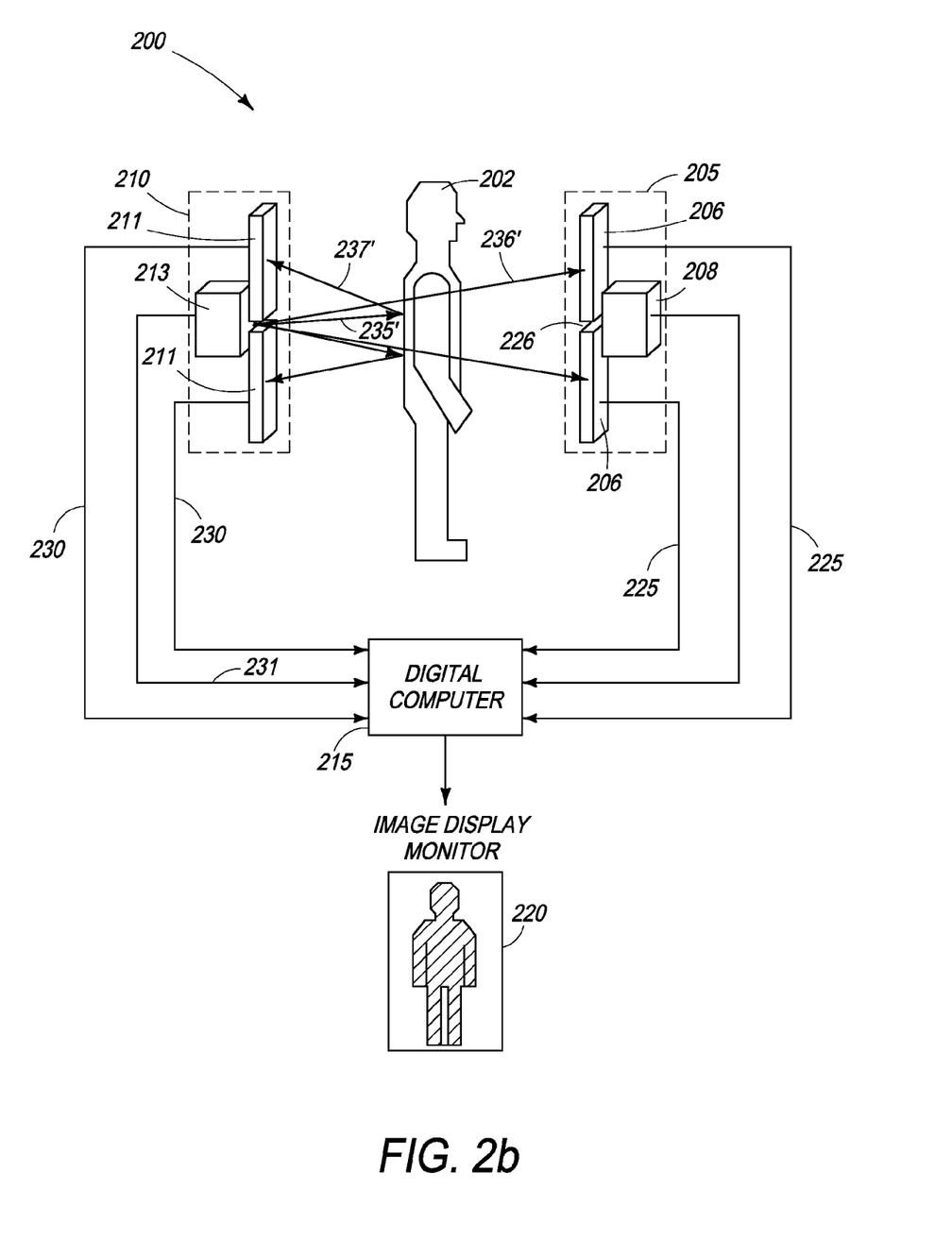
FIG. 2b is a side view of the screening system of the present invention, further illustrating a subject being scanned by the second module.

FIGS. 2a and 2b are perspective views of the first module 205 and second module 210 respectively, of the imaging system 200, providing pencil beams 235, 236 (in FIG. 2a) and 235', 236' (in FIG. 2b) of X-rays directed at the body of the subject 202 being examined. The generation of pencil beams is described with respect to FIG. 3 below.

FIG. 2a is a side view of the screening system of the present invention, further illustrating a subject under inspection by the first module 205. In one embodiment, subject under inspection 202 stands with his front side facing the first module 205 and his back side toward second module 210. While the present invention is described with respect to screening a subject assuming this pose, it should be understood by those of ordinary skill in the art that the subject may be positioned in several other poses to achieve the same effect. When first module 205 is activated, X-rays 235 are emitted and X-rays that are scattered or reflected 237 from the front side of the subject 202 are detected by X-ray sensitive detectors 206 positioned on the same side of the subject 202 as is the X-ray pencil beam source 208 of the first module 205 while the remaining incident X-rays 236 that are not absorbed or reflected by the subject 202 are detected by the detectors 211 of the second module 210 on the side opposite to the source 208. The detectors 206 and 211 are positioned for substantially uniform X-ray detection on all sides of the incident X-ray beams 235, 236.

In one embodiment, electronic signals 225, 230 produced from the detectors 206, 211 are routed into digital computer 215. In another embodiment, synchronization signals 226 from the X-ray source 208 are also routed into digital computer 215, and vice-versa. The computer 215 combines the front side scattered imaging signals 225 and the front side shadow imaging signals 230 from both detectors 206, 211, respectively, to generate the front side image of the body on a monitor (screen) 220.

FIG. 2b is a side view of the screening system of the present invention, further illustrating a subject being scanned by the second module 210. With reference to FIG. 2b, when the second module 210 is activated X-rays 235' are emitted and X-rays 237' that are scattered or reflected from the back side of the subject under inspection 202 are detected by X-ray sensitive detectors 211 positioned on the same side of the subject as the X-ray pencil beam source 213 of the second module 210 while the remaining incident X-rays 236' that are not absorbed or backscattered by the subject 202 are detected by the detectors 206 of the first module 205 on the side opposite to the source 213 of the second module 210.

In one embodiment, electronic signals 225, 230 produced from detectors 206, 211 for the back side of the subject under inspection 202 are routed into digital computer 215. In another embodiment, synchronization signals 231 from X-ray source 213 are also routed into digital computer 215, and vice-versa. The computer 215 combines the back side scattered imaging signals 230 and the back side shadow imaging signals 225 from both detectors 211, 206, respectively to generate the back side image of the body on the monitor (screen) 220.

Thus, in one embodiment, by placing detector arrays 206, 211 on opposing sides of the inspection area, the image quality of the subject under inspection is enhanced because image signals generated from backscattered radiation and shadow images are combined to form a detailed image.

Referring again to FIGS. 2a and 2b, in one embodiment of the present invention, first module 205 and second module 210 sequentially scan the subject 202. Sequential scanning ensures that the two scanning beams of X-rays 235 and 235' generated from first module 205 and second module 210, respectively, do not interfere with each other. Thus, when the subject 202 stands between first module 205 and second module 210, radiation source 208 on first module 205 is activated first for scanning the side of the subject 202 facing first module 205, which is in one embodiment, the front side of subject 202. It should be appreciated that the digital computer 215 comprises a processor, memory, and software for synchronizing the sequence and timing of the scanning by the first and second modules. Furthermore, it should be appreciated that the first and second modules are attached to vertical structures that permit and enable the vertical physical movement of the modules, as driven by at least one motor that receives timing signals from the digital computer 215.

Once the first module scan is completed the radiation source 208 of the first module 205 is deactivated and the source 213 of the second module 210 is activated to initiate the scan of the other side of the subject 202 facing the second module 210. Thus, the scans from the first and the second modules occur sequentially, one after another, to eliminate possibility of interference of the beams 235, 235' from first and second modules 205, 210, respectively.

Figure 3:
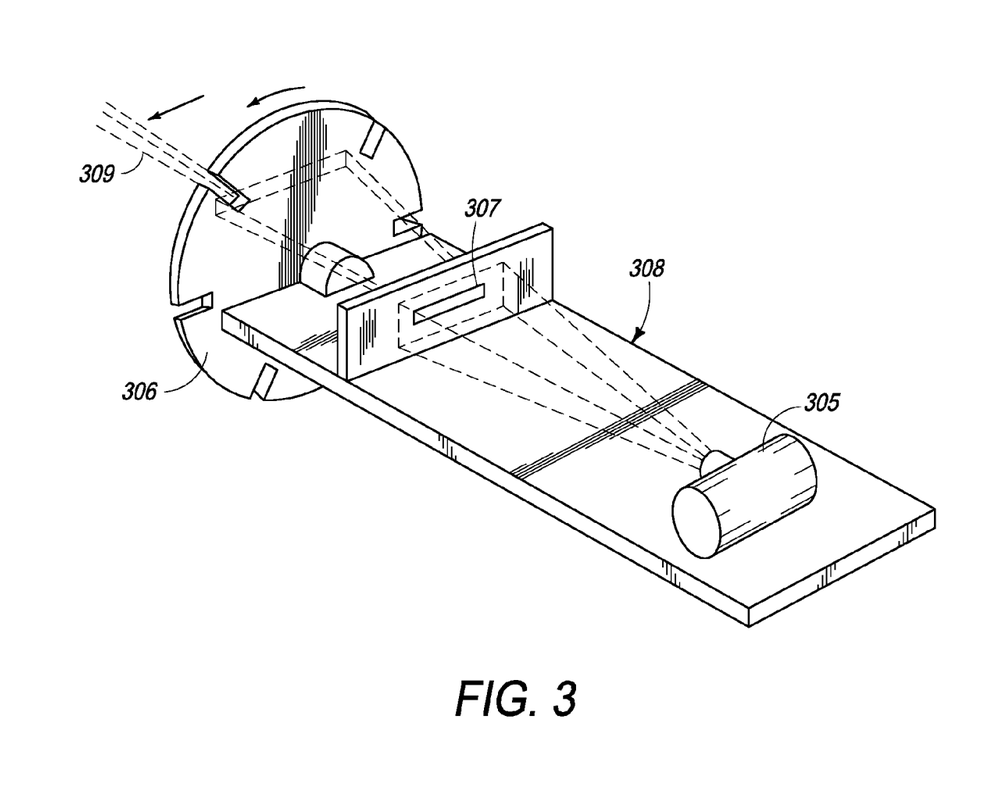
FIG. 3 is an illustration of one embodiment of a mechanical means for generating a horizontal sweeping pencil beam of X-rays.

FIG. 3 is an illustration of one embodiment of a mechanical means for generating a horizontal sweeping pencil beam of X-rays. Referring now to FIG. 3, each screening module comprises an X-ray tube 305, a mechanical chopper wheel 306 and slit 307, which combine to create X-ray pencil beam source 308, as is known in the art, for scanning the pencil beam 309 in a horizontal motion across the body of a subject. The generation of such pencil beams is well-known to those of ordinary skill in the art and will not be discussed in further detail. It should be appreciated that, in one embodiment, a gap between the two detector arrays of the first and second modules, shown as 226 in FIG. 2b, can act as a beam shaping slit through which X-rays are emitted.

Figure 4A:
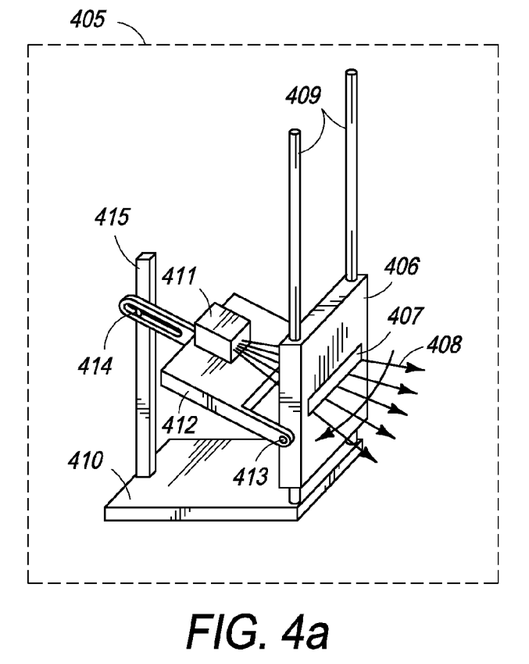
FIGS. 4a and 4b depict one embodiment of a mechanical means for generating a vertical sweeping pencil beam of X-rays.
Figure 4B:
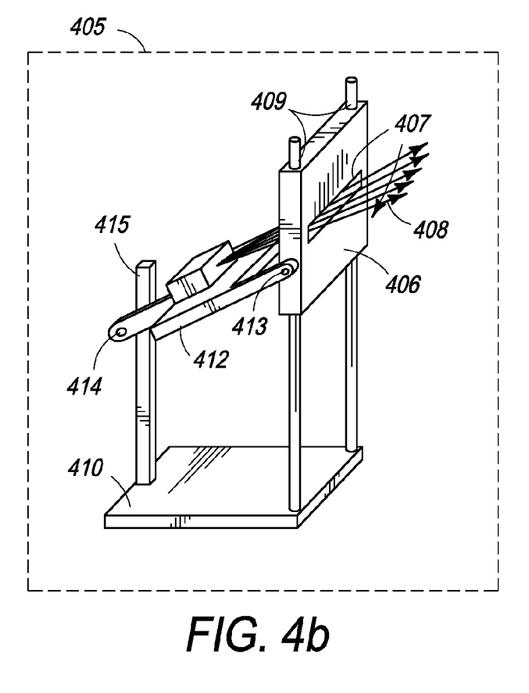

FIGS. 4a and 4b depict one embodiment of a mechanical means for generating a vertical sweeping pencil beam of X-rays that will scan the entire height of a subject under inspection. While FIGS. 4a and 4b illustrate the vertical mechanism with reference to first module of the imaging system of the present invention, it is to be understood that a similar mechanism occurs for enabling vertical sweep of the X-ray beam of the second module.

Referring back to FIGS. 4a and 4b, the detectors 406 contain opening 407 through which the pencil beams of X-rays 408 pass before striking the subject under examination. Detectors 406 are mounted on two vertical shafts 409 which are in turn mounted on a base 410 to guide the motion of the detectors 406 as they are moved in a vertical direction. The X-ray pencil beam source 411 is mounted on a carriage 412, which in turn is supported by pivot joint 413, connected to detector 406, and pivot joint 414, connected to a vertical support 415. As the detectors 406 are moved in a vertical direction, the X-ray pencil beam 408 is moved in an arc, such that it always passes through the opening 407 in the detector 406.

Referring again to FIG. 2a, and keeping in mind the vertical motion mechanism of the modules described above with respect to FIGS. 4a and 4b in mind, when first module 205 is activated for scanning the first side of the subject 202 facing the first module 205 the second module source 213 remains deactivated. However, as described earlier, the imaging system of the present invention uses backscatter imaging signals generated by detection by a first module in combination with the shadow image signals generated by detection by a second module to generate an image of the side of the subject facing that module.

Therefore, although the radiation source 213 of second module 210 remains deactivated while the first module 205 is scanning the subject 202, the source 213 and detector 211 of the second module 210 move in sync with the vertical motion of the source 208 and detector 206 of the first module 205. This is to ensure that while the backscatter image signals 225 due to X-rays 235 from the first module 205 striking the subject 202 are captured by the detectors 206 of the first module 205, the shadow image signals 230 due to X-rays 236 from the first module 205 are also captured by the detectors 211 of the second module 210 that had been moving in sync with the first module 205.

Referring now to FIG. 2b, once the scan from the first module 205 is complete, the radiation source 208 of the first module 205 is deactivated and the source 213 of the second module 210 is activated to start the scan of the back side of the subject 202. As the second module 210 scans subject 202, and moves vertically, first module 205 (with its source deactivated) moves in sync with the second module 210, capturing the shadow image signals 225. The X-ray imaging system of the present invention is fully automated in one embodiment. In another embodiment, the imaging system of the present invention is semi-automated with operator assistance.

In one embodiment, both the first module 205 scan and second module 210 ranges in time from 0 seconds to 20 seconds. In one embodiment, the scan time is 3 seconds.

In one embodiment, the vertical movement of the source and detectors is 4 to 5 feet. It should be noted herein that while a vertical movement is described with respect to this embodiment, the source and detector may swivel, pivot, rotate, or make a combination of these movements.

In one embodiment, the distance between first module 205 and second module 210 is in the range of 2-10 feet. In one embodiment, the distance between first module 205 and second module 210 is 3 feet.

Referring back to FIG. 1, in one embodiment, the floor or base or platform 135 of the structure 102 is pressure sensitive such that as soon as the subject under inspection 104 steps on to the floor 135 an embedded pressure sensor (not shown) triggers the activation of the imaging system 100. The subject 104 is then scanned on a first side by the first module 105 and thereafter on the second side by the second module 110, or vice-versa. Once both the front side and the back side of the subject under inspection 104 have been completed, first module 105 and second module 110 deactivate and stop scanning, waiting for the next subject to step upon the floor or base 135.

Other embodiments of scan triggering mechanisms may be employed such as infra-red beam interruption where the scanning is triggered when a subject enters the booth structure and in doing so intercepts a beam of infra red rays installed in the structure. Other triggering mechanisms would also be evident to persons of ordinary skill in the art.

In another embodiment, the screening system of the present invention is semi-automated, in that an operator manually triggers the scanning cycle. Once triggered, the scanning cycle completes the sequential front and back screening of the subject as predetermined or pre-programmed.

During operation of the system 100, the subject 104 is first scanned with the imaging system 100 to obtain digital image signals of both the front and back of the subject 104. As shown in FIG. 1, the imaging system 100 produces image signals 125, 130 that are modulated by characteristics of the body of the person 104 being examined. The image signals 125, 130 are routed into a digital computer system 115 such as an IBM PC that is capable of implementing preprogrammed instructions for image analysis. The computer system 115 comprises a memory in which is stored the library of previous image signals of persons not concealing dangerous objects. The computer system 115 uses this information to generate a processed image on monitor 120 in which image features that correspond to common benign objects and normal human anatomy are suppressed. The operator viewable image may be inspected for evidence of dangerous concealed objects.

In one embodiment, in order to preserve the subject's privacy, certain anatomical features may be suppressed or screened out to avoid the display of these features to the system operator. The key features in the newly acquired image are then compared with a stored library containing previously obtained human images. This library of human images is used to identify common anatomical features in the present subject so those anatomical features can be suppressed. The library may also contain within its images certain common benign objects which can also be suppressed to permit more accurate detection of dangerous or illegal concealed objects. These common anatomical and benign features are not of concern to the system operator and are suppressed in the processed image signal. The remaining features in the image are regarded as unusual and potentially indicative of objects that the system operator is attempting to detect.

The location of detected features can be referenced to the absolute location in the image, or in relation to the body of the person being examined. The latter method has the advantage of being insensitive to subject positioning within the imaging window and differing subject size.

The suppression of anatomical and benign image features can consist of selectively displaying the features at reduced intensity, in a different color, or removing them entirely from the image. In one embodiment, the outline of the subject's body is removed from the image and a humanoid outline is substituted for location reference. In another embodiment, if very few or no abnormal features are detected, the display may consist of alpha-numeric information, such as: "No abnormal features detected" or "Diagonal edge detected on upper chest".

The task of isolating an object from the associated background is a common problem in the art of image processing. It is well known that detection of an object edge is often more reliable than detection of the entire object based on a shifted signal level alone. Edge enhancement is a common method of processing digitally represented images to increase the detectability of objects. The present invention uses extensive edge detection in visual processing as described in U.S. Pat. No. 5,181,234, the specification of which is hereby incorporated by reference. In order to enable edge enhancement for detection and enhance the quality of the images of the front side and back side of the subject, both the radiation backscattered from the subject as well as the shadow signals of the subject due to radiation not striking the subject are combined.

U.S. Pat. No. 7,110,493, assigned to the assignee of the present invention, describes "[a] method for detecting concealed items on or in an object, the method comprising: producing a pencil beam of x-rays from an x-ray source directed toward said object; scanning said beam of x-rays over the surface of said object; and detecting x-rays scattered from said beam of x-rays as a result of interacting with said object and a low Z material panel, said object located between said detector and said panel, said detecting comprising differentiating x-rays back scattered by the object from those back scattered by the low Z material panel, wherein said pencil beam of x-rays exposes said object to an x-ray dose in the range of about 1 microRem to about 10 microRem", and is herein incorporated by reference in its entirety.

Also, while in one embodiment the operator is presented with discrete, processed images of the front side and back side of the subject adjacent to each other on the monitor screen, in an alternate embodiment these two images are combined to generate a three dimensional image (still suppressed with anatomical details) that can be rotated on the screen by the operator to view a combined image of the front side and back side. It should be appreciated that the scanning functions described herein, including the initiation, and processing, of backscatter and transmission scanning is performed by programmable code stored in the digital computer and executed by the processor.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. An imaging apparatus for detecting a concealed object carried on a stationary human body comprising:
    a first module, further comprising a first X-ray source for producing a first pencil beam of X-rays directed toward said human body and a first detector assembly providing a signal representative of the intensity of the X-rays scattered from said human body as a result of being scanned by the first X-ray source, said first detector assembly being disposed on a same side of said human body as said first X-ray source and having an active area for receiving a portion of said scattered X-rays from said human body as a result of being scanned by said first X-ray source and a portion of transmitted X-rays;
    a second module, further comprising a second X-ray source for producing a second pencil beam of X-rays directed toward said human body and a second detector assembly providing a signal representative of the intensity of the X-rays scattered from said human body as a result of being scanned by said second X-ray source, said second detector assembly being disposed on a same side of said human body as said second X-ray source and having an active area for receiving a portion of said scattered X-rays from said human body as a result of being scanned by said second X-ray source and a portion of transmitted X-rays from the first module;
    a processor for processing detector signals generated from said first detector assembly and second detector assembly to form at least one image wherein said processor processes programmable code that causes the first module or the second module to move vertically while said body remains stationary; and
    a display for presenting said at least one image to an operator.

2. The imaging apparatus of claim 1, further comprising an enclosure having four walls.

3. The imaging apparatus of claim 2, further comprising at least one ceiling and at least one floor.

4. The imaging apparatus of claim 1 wherein said processor processes programmable code that causes said first module to scan the human body while the second X-ray source is not activated.

5. The imaging apparatus of claim 1 wherein said processor processes programmable code that causes said second module to scan the human body while the first X-ray source is not activated.

6. The imaging apparatus of claim 1 wherein said vertical movement is coordinated.

7. The imaging apparatus of claim 1 wherein the first module is interchangeable with the second module.

8. The imaging apparatus of claim 1 wherein processor is adapted to process signals representative of the intensity of the X-rays scattered from said human body as a result of being scanned by the first X-ray source from first detector assembly and signals representative of the intensity of the X-rays scattered from said human body as a result of being scanned by the second X-ray source from second detector assembly to generate said image.

9. The imaging apparatus of claim 1 wherein processor is adapted to processes signals representative of the intensity of the X-rays scattered from said human body as a result of being scanned by the second X-ray source from second detector assembly and signals representative of the intensity of the X-rays scattered from said human body as a result of being scanned by the first X-ray source from first detector assembly to generate said image.

10. The imaging apparatus of claim 1 wherein said processor is adapted to process signals representative of the intensity of the transmitted X-rays from the first module to form a shadow image of the human body.

11. The imaging apparatus of claim 1 wherein said processor is adapted to process signals representative of the intensity of the transmitted X-rays from the second module to form a shadow image of the human body.

12. The imaging apparatus of claim 1 wherein the first module and second module sequentially scan the human body.

13. The imaging apparatus of claim 1 wherein said processor processes programmable code that causes the first module and second module to move vertically in a synchronous manner such that, while the first detector array captures backscattered image signals, the second detector array captures transmitted signals that are not absorbed or backscattered by the human body.

14. The imaging apparatus of claim 1 wherein said processor processes programmable code that causes the first module and second module to move vertically in a synchronous manner such that, while the second detector array captures backscattered image signals, the first detector array captures transmitted signals that are not absorbed or backscattered by the human body.

15. The imaging apparatus of claim 1 wherein signals produced from the first detector array and second detector array are routed to the processor along with synchronization signals.

16. An imaging apparatus for detecting a concealed object carried on a stationary human body comprising:
    a first module, further comprising a first X-ray source and a first detector assembly, said first detector assembly being disposed on a same side of said human body as said first X-ray source and having an active area for receiving a portion of X-rays scattered from said human body as a result of being scanned by said first X-ray source and a portion of transmitted X-rays;

a second module, further comprising a second X-ray source and a second detector assembly, said second detector assembly being disposed on a same side of said human body as said second X-ray source and having an active area for receiving a portion of said scattered X-rays from said human body as a result of being scanned by said second X-ray source and a portion of transmitted X-rays from the first module; wherein said first and second modules are parallel to each other;

a processor for processing detector signals generated from said first detector assembly and second detector assembly to form at least one image wherein said processor is adapted to process signals representative of the intensity of the X-rays scattered from said human body as a result of being scanned by the first X-ray source from first detector assembly and signals representative of the intensity of the X-rays scattered from said human body as a result of being scanned by the second X-ray source from second detector assembly to generate said image and wherein said processor processes programmable code that causes the first module or the second module to move vertically while said body remains stationary; and a display for presenting said at least one image to an operator.

17. The apparatus of claim 16 wherein the first module and second module sequentially scan the human body.

18. The apparatus of claim 17 wherein said processor processes programmable code that causes the first module and second module to move vertically in a synchronous manner such that, while the first detector array captures backscattered image signals, the second detector array captures transmitted signals that are not absorbed or backscattered by the human body.

* * * * *

UNITED STATES PATENT AND TRADEMARK OFFICE
CERTIFICATE OF CORRECTION

PATENT NO. : 7,826,589 B2  Page 1 of 1
APPLICATION NO. : 12/344162
DATED : November 2, 2010
INVENTOR(S) : Andreas Kotowski and Ronald J. Hughes It is certified that error appears in the above-identified patent and that said Letters Patent is hereby corrected as shown below:

Column 5, lines 43-47, These techniques are discussed in detail in co-pending U.S. patent application Ser. No. 12/204,320, entitled "Personnel Security Screening System with Enhanced Privacy", filed on Feb. 2, 2008, and herein incorporated by reference in its entirety." should read
--These techniques are discussed in detail in co-pending U.S. patent application Ser. No. 12/024,320, entitled "Personnel Security Screening System with Enhanced Privacy", filed on February 1, 2008, and herein incorporated by reference in its entirety.--

Signed and Sealed this
Sixteenth Day of August, 2011

David J. Kappos
*Director of the United States Patent and Trademark Office*